United States Patent [19]

Matsumoto

[11] Patent Number: 4,581,990
[45] Date of Patent: Apr. 15, 1986

[54] VEGETABLE AND FRUIT SLICING APPARATUS

[75] Inventor: Hideo Matsumoto, Urawa, Japan

[73] Assignee: Kabushiki Kaisha Honma, Tokyo, Japan

[21] Appl. No.: 656,839

[22] Filed: Oct. 2, 1984

[30] Foreign Application Priority Data

Aug. 28, 1984 [JP] Japan .................... 59-177479

[51] Int. Cl.⁴ .............................. A47J 17/00
[52] U.S. Cl. ............................ 99/538; 99/537; 99/547; 99/594
[58] Field of Search ............. 99/485, 509, 537–543, 99/544, 545, 547, 548, 567, 584, 594–599, 636, 642; 83/431, 733, 825.1

[56] References Cited

U.S. PATENT DOCUMENTS

| | | | |
|---|---|---|---|
| 430,139 | 6/1890 | Meyer | 99/598 |
| 2,156,645 | 5/1939 | Waller | 99/594 |
| 3,211,202 | 10/1965 | Mason | 99/595 X |
| 3,382,901 | 5/1968 | Pheterson | 99/547 |
| 3,881,406 | 5/1975 | Perez | 99/599 X |

*Primary Examiner*—Timothy F. Simone
*Attorney, Agent, or Firm*—Sprung, Horn, Kramer & Woods

[57] ABSTRACT

A vegetable and fruit slicing apparatus including a member for rotating an object to be sliced about the axis of the object, a cutter blade, a mechanism for moving the cutter blade. The moving mechanism moves the cutter blade along a path oblique to the rotational axis of the object, thereby enabling the object to be sliced in such a manner that only a conical or truncated-conical core remains unsliced.

15 Claims, 6 Drawing Figures

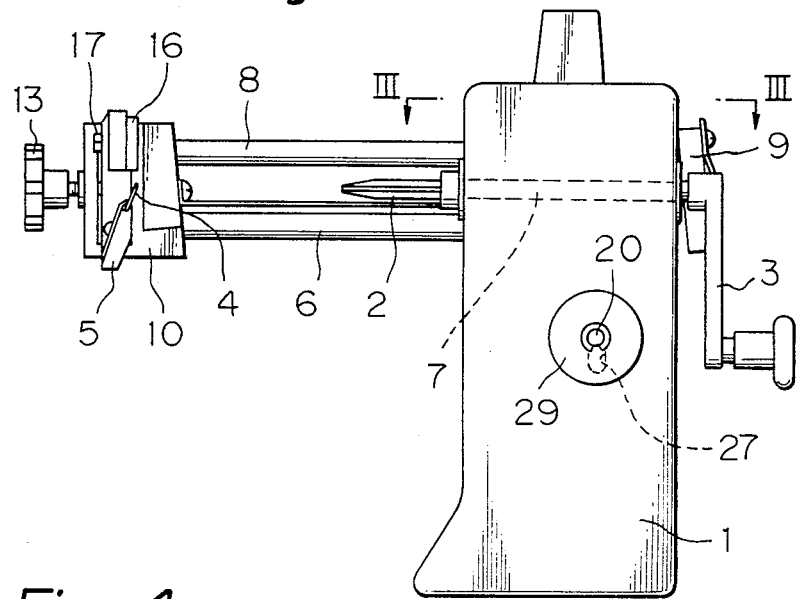
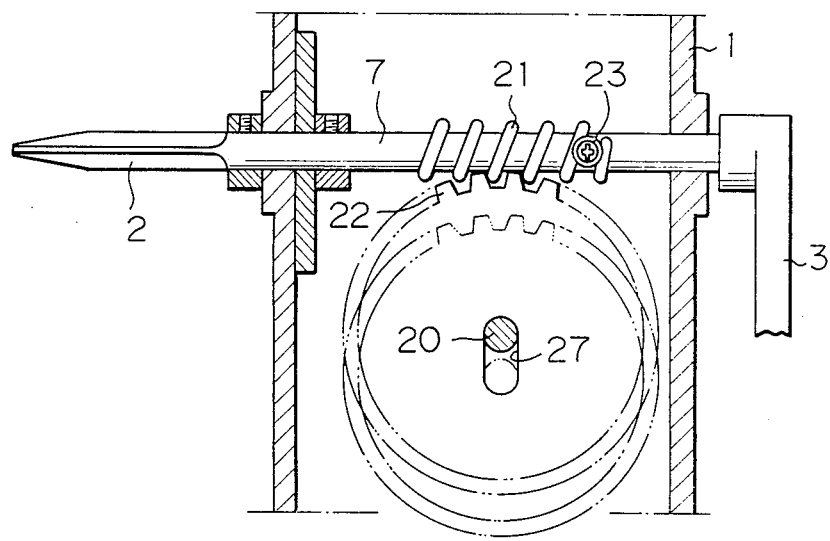

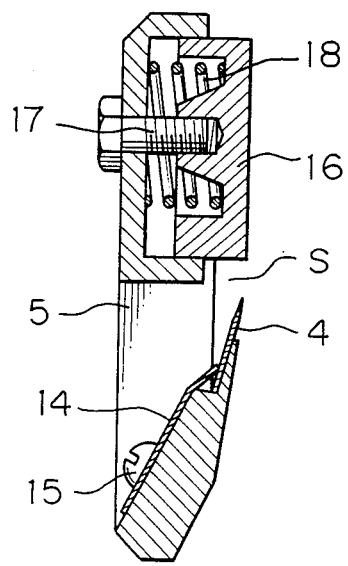
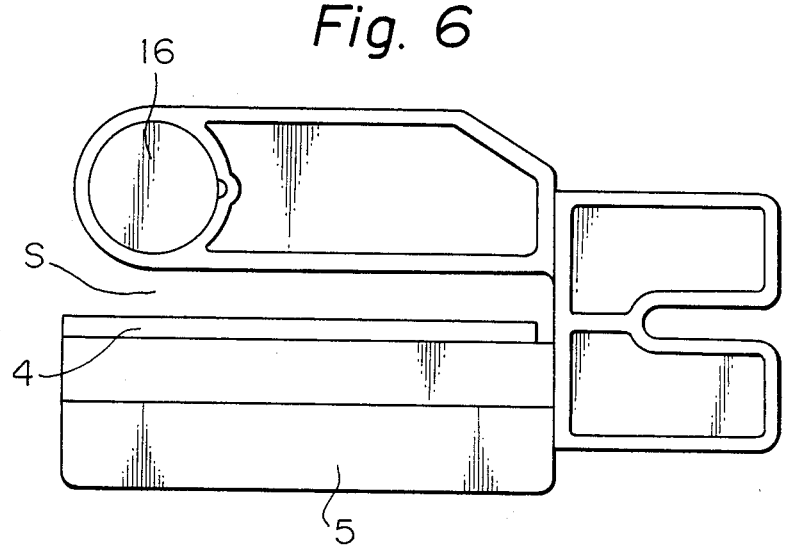

VEGETABLE AND FRUIT SLICING APPARATUS

BACKGROUND OF THE INVENTION

1. Field of the Invention

The present invention relates to an apparatus for slicing vegetables and fruit having a core, in particular, cabbage.

2. Description of the Prior Art

In conventional vegetable and fruit slicing apparatuses, the cabbage is either (a) sliced by a plane cutter, or (b) the cutter is rotated to slice the cabbage. In these conventional apparatuses, it is difficult to slice a cabbage in such a way that only the core remains. This is because the core is normally cone-shaped, i.e., thick at the root and thin at the tip, and the conventional apparatuses are not constructed to slice a cabbage with such a cone-shaped core. Further, in the case of apparatus (a), it takes a long time to slice-up a cabbage entirely, and in the case of apparatus (b), the cabbage cannot be sliced into pieces having a uniform thickness.

SUMMARY OF THE INVENTION

An object of the present invention is to provide a slicing apparatus by which a fruit or vegetable, such as a cabbage, can be completely sliced in such a manner that only a core remains.

According to the present invention, there is provided a vegetable and fruit slicing apparatus comprising a frame, rotating means, a cutter blade, and cutter moving means.

The rotating means is mounted on the frame, and rotates the object to be sliced about a rotational axis. The cutter moving means is provided to move the cutter blade in synchronization with the rotation of the object to be sliced; the cutter being moved along a path substantially intersecting the rotational axis at an angle calculated to slice the object in such a manner that a conical or truncated-conical core of the object will remain after slicing is completed.

BRIEF DESCRIPTION OF THE DRAWINGS

The present invention may be more fully understood from the description of preferred embodiments of the invention set forth below, together with the accompanying drawings, in which;

FIG. 2 is a side view of the embodiment of FIG. 1;

FIG. 4 a sectional view of the rotational rod and the frame;

FIG. 5 is a sectional view along line V—V of FIG. 3; and

FIG. 6 is a front view of the support member.

DESCRIPTION OF THE PREFERRED EMBODIMENTS

In the following description, it is assumed that the object to be sliced is a cabbage.

Figure 1:
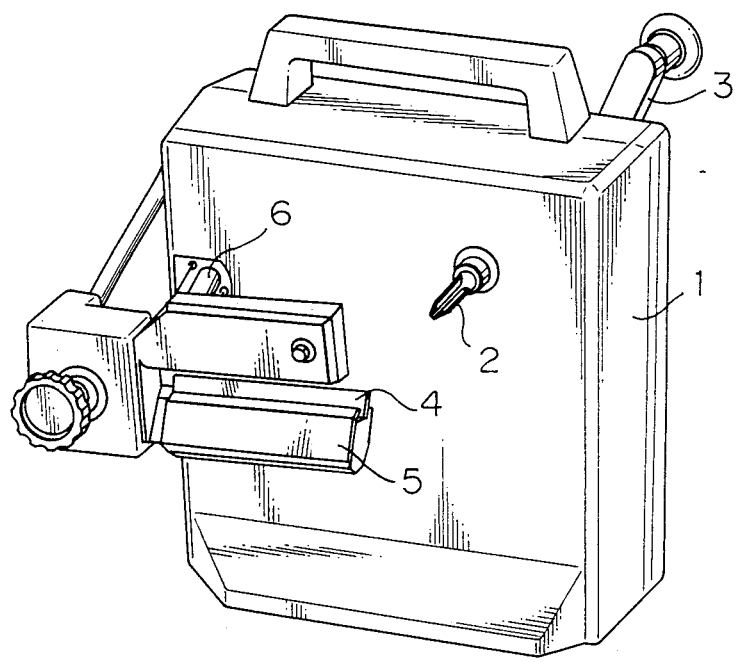
FIG. 1 is a perspective view of an embodiment of the present invention.

Referring to FIG. 1, a box type frame 1 is provided with a spit 2 which is rotated about the axis thereof by a handle 3, and a cutter blade 4 which is moved along a path substantially intersecting at an angle with the axis of the spit 2. The cutter blade 4 is fixed on a support member 5 provided on an oblique rod 6. The path of the cutter blade 4 is defined by the oblique rod 6, which is positioned obliquely to the axis of the spit 2. The cutter blade 4 is moved toward the spit 2 in synchronization with the rotation of the spit 2; that is, the cutter blade 4 is moved closer to the spit 2 at a rate of 0.5 mm per one revolution of the spit 2, so that a cabbage impaled on the spit 2 is sliced into pieces having a uniform thickness, as described hereinafter.

Figure 3:
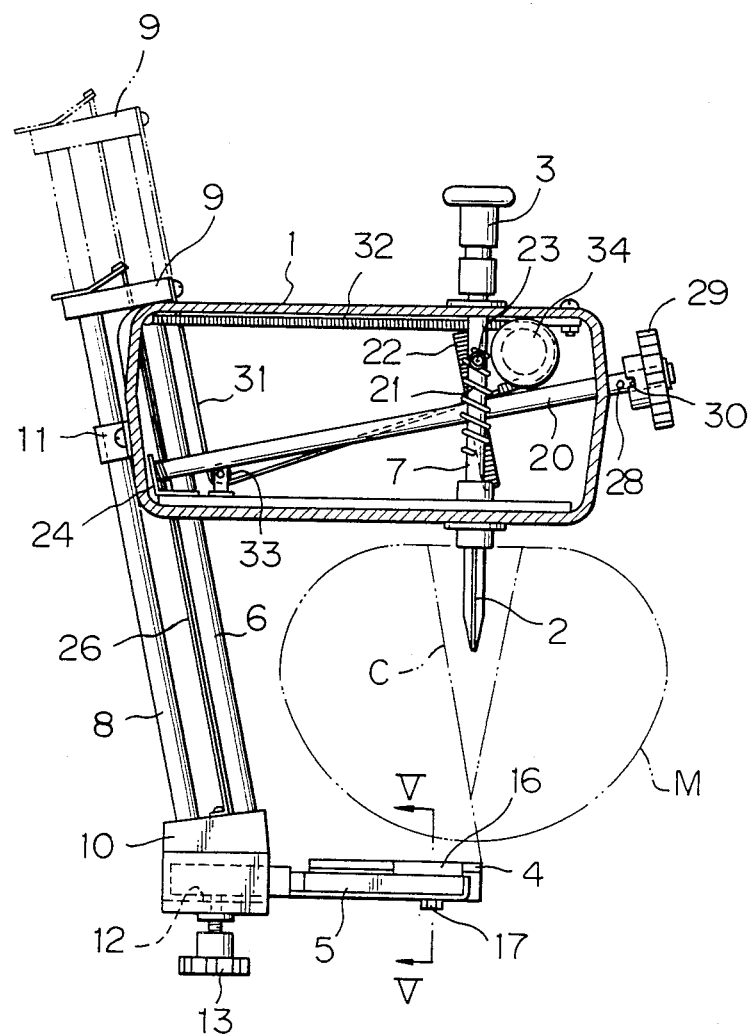
FIG. 3 is a partial view of the embodiment taken in the direction of the arrow substantially along the line III—III of FIG. 2.

As shown in FIGS. 2 to 4, a rotational shaft 7 is supported in a position horizontal to the frame 1, and is rotatable about its axis. Both ends of the rotational shaft 7 project from the frame 1, on opposite sides of the frame 1. The spit 2 is provided at one end of the rotational shaft 7, and the handle 3 is fixed to the other end of the rotational shaft 7. The tip of the spit 2 is tapered, and the body of the spit 2 has a sectional shape in the form of substantially a cross. This shape ensures that a cabbage M to be sliced can be easily impaled on, and stably rotated by, the spit 2. The spit 2 may be made detachable from the rotational shaft 7.

The oblique rod 6 penetrates the frame 1 and is slidably supported thereby, and can move reciprocally along the axis thereof. The oblique rod 6 is situated in a horizontal plane positioned slightly under the plane of the rotational shaft 7 and the spit 2, and is connected to a guide rod 8 at both ends by connecting members 9 and 10, respectively. The guide rod 8 is located parallel to the oblique shaft 6 and is slidably supported by a tube member 11 fixed to the outer surface of the frame 1.

An end portion of a support member 5 is detachably supported in a recess 12 provided in the front connecting member 10, and is fixed therein by a screw 13. As shown in FIG. 5, the cutter blade 4 is supported and held by a plate 14 fixed to a back surface of the support member 5 by a screw 15. A press member 16 for exerting pressure on the cabbage to be sliced is fixed to the support member 5 by an adjusting bolt 17, and a spring 18 is inserted between the support member 5 and the press member 16. The press member 16 has a flat round surface which engages with the cabbage to be sliced, as shown in FIG. 6, and is positioned to the rear of the direction of rotation of the cabbage to be sliced in comparison with the cutter blade 4 in a location near to the rotational axis of the spit 2, so that a space S, through which the cut pieces of the cabbage can pass, is defined between the press member 16 and the cutter blade 4. Normally, the surface of the press member 16 projects slightly toward the cabbage to be sliced in comparison with the cutter blade 4, as shown in FIG. 5. The amount of projection is adjusted by the adjusting bolt 17. When the thickness of the pieces sliced from the cabbage is to be increased, the press member 16 can be adjusted so that it is closer to the support member 5 in relation to its former position to the cutter blade 4.

The oblique rod 6 is moved by a transmitting shaft 20 in accordance with the rotation of the rotational shaft 7. That is, a worm 21 provided on the rotational shaft 7 is threadingly engaged with a gear 22 fixed on the transmitting shaft 20, in such a manner that rotation of the rotational shaft 7 causes the transmitting shaft 20 to rotate. The worm 21 of the rotational shaft 7 is formed by helically winding a wire around the rotational shaft 7 and fixing a pin 23 at an end portion of the wire. The pitch of the worm 21 can be freely provided by selecting any pitch of a helical shape. Rotation of the rotational shaft 7 is transmitted to the oblique rod 6 through the transmitting shaft 20 in such a manner that the oblique rod 6 is moved along its axis. An end portion of the transmitting shaft 20 is connected to the oblique rod 6 by a cord 26 wound on the end portion of the transmitting shaft 20, both ends of the cord 26 being fixed to both ends of the oblique rod 6, so that rotation of the transmitting shaft 20 is transformed to a reciprocal movement of the oblique rod 6. Thus, the oblique rod 6 is moved along its axis in accordance with the rotation of the rotational shaft 7.

An end portion of the transmitting shaft 20 is swingably attached to and supported by a flexible L-shaped bracket 24 attached to an inner wall of the frame 1, thus enabling the gear 22 to be disengaged from the worm 21 by swinging the transmitting shaft 20 in the bracket 24. A spring (not shown) is provided for urging the gear 22 into engagement with the worm 21. The other end of the transmitting shaft 20 protrudes from the frame 1 through an ellipse hole 27 formed in the frame 1, and is provided with a pin 28 and a knob 29. The pin 28 is fixed to the transmitting shaft 20 in such a manner that an end of the pin 28 projects from each opposite side of the transmitting shaft 20. The knob 29 has a notch 30 engageable with the pin 28 to enable the knob 29 to rotate the transmitting shaft 20, and is freely rotatable about the transmitting shaft 20 when disengaged from the pin 28. Thus, when the knob 29 is engaged with the pin 28, and the gear 22 is disengaged from the worm 21, the oblique rod 6 is caused to move along its axis in a required direction by the knob 29.

Conversely, when the knob 29 is disengaged from the pin 28, and the gear 22 is disengaged from the worm 21, the oblique rod 6 automatically moves in a direction which will move the cutter blade 4 away from the frame 1. That is, a cord 31 is connected between the rear connecting member 9 and a return spring 32 through a roller 33; the return spring 32 is connected to an inner wall of the frame 1 and supported by a roller 34. The disengagement of the gear 22 from the worm 21, and of the knob 29 from the pin 28, allows free rotation of the transmitting shaft 20, thus freeing the oblique rod 6 from any restraint by the transmitting shaft 20. The end connecting member 9 at one end of the oblique rod 6 is under a pulling tension caused by the cord 31 attached to the return spring 32. Therefore, when the aforesaid restraint is removed from the oblique rod 6, it is pulled by the cord 31 and return spring 32 in a direction that will cause the cutter blade 4 to move away from the spit 2, and thus the oblique rod 6 is automatically returned to a position where the cutter blade 4 is located at a point farthest from the spit 2.

According to the above-described construction of this embodiment of the present invention, an object such as a cabbage M is sliced as follows.

First, the transmitting shaft 20 is rotated within the ellipse hole 27 so that the gear 22 disengages from the worm 21, the knob 29 is disengaged from the pin 28, and the cutter blade 4 is thus allowed to move to a position farthest from the spit 2. The support member 5 is then detached from the recess 12, and the cabbage M to be sliced is impaled on the spit 2. If the spit 2 is detachable from the rotational shaft 7, the cabbage M is first impaled on the spit 2, and the spit 2 is then attached to the rotational shaft 7. The support member 5 is reattached in the recess 12, and the knob 29 is engaged with the pin 28 and the transmitting shaft 20 is rotated again within the hole 27 so that the gear 22 is disengaged from the worm 21. The transmitting shaft 20 is then rotated to move the cutter blade 4 near to the cabbage M. Then the handle 3 is rotated, causing the cabbage M to be rotated by the spit 2 while the cutter blade 4 is moved toward the cabbage M. The cutter blade 4 engages with and slices the cabbage M, and the sliced pieces of cabbage pass through the space S and fall into a pan (not shown) set under the spit 2. The cutter blade 4 is moved along a path in a direction oblique to that of the axis of the spit 2, whereby the cabbage M is sliced leaving a conical or truncatedconical core C as shown in FIG. 3.

To enable the core C to be removed from the spit 2, the gear 22 is disengaged from the worm 21, the transmitting shaft 20 is rotated within the ellipse hole 27, and the knob 29 is disengaged from the pin 28, thus allowing the transmitting shaft 20 to rotate independently from the rotational shaft 7 and the knob 29. The oblique rod 6 is then automatically moved in the direction which will cause the cutter blade 4 to move away from the spit 2, the resulting space formed between them allowing the removal of the core from the spit 2.

The thickness of the sliced pieces of cabbage is varied by changing the amount of protrusion of the press member 16, and the slicing operation is carried out in accordance with the thickness required for the sliced pieces. That is, where the cabbage is to be sliced into pieces 0.5 mm thick, which thickness is equal to the pitch of the cutter blade 4 per one revolution of the rotational shaft 7, the cabbage is sliced during one rotation of the cabbage; when the cabbage is to be sliced into pieces 1.00 mm thick, which thickness is twice the pitch of the cutter blade 4, the cabbage is sliced once per every two revolutions of the cabbage; and accordingly, when the cabbage is to be sliced into pieces 2.0 mm thick, the cabbage is sliced once per every four revolutions of the cabbage.

Although the embodiments of the present invention have been described herein with reference to the attached drawings, many modifications and changes may be made by those skilled in this art without departing from the scope of the invention.

I claim:

1. An apparatus for slicing an object having a core such as a vegetable and fruit comprising:

a frame;

means mounted on said frame for rotating the object about a rotational axis;

a cutter blade; and means for moving said cutter blade in synchronization with the rotation of said object and along a predetermined path substantially intersecting said rotational axis at an angle to form a conical or trunco-conical core on the rotating means upon completion of sliding by the cutter blade, said moving means comprising (a) an oblique rod supported by said frame in such a manner that said rod is positioned obliquely to said rotational axis, said oblique rod being provided with a support member for supporting said cutter blade, and (b) a transmitting shaft connected to said oblique rod, and a rotational shaft in geared contact with said transmitting shaft, said rotational shaft rotating about said rotational axis, rotation of said rotational shaft being transmitted to said oblique rod through said transmitting shaft so that said oblique rod moves along the axis thereof.

2. An apparatus according to claim 1, wherein said support member has a press member pressing the object to be sliced, said press member being positioned to the rear of the rotation direction of the object to be sliced relative to said cutter, and being situated close to the rotational axis of the object to be sliced.

3. An apparatus according to claim 2, wherein space through which sliced pieces of said object pass is defined between said press member and said cutter blade.

4. An apparatus according to claim 2, wherein said press member has a flat round surface engaging with the object to be sliced.

5. An apparatus according to claim 4, wherein said press member projects toward the object to be sliced relative to said cutter blade.

6. An apparatus according to claim 1, wherein said support member is detachably fixed into a recess provided in said oblique rod.

7. An apparatus according to claim 1, wherein said rotational shaft is helically wound with a wire and said transmitting shaft is provided with a gear, said wire and gear being threadingly engaged with each other.

8. An apparatus according to claim 7, wherein said wire is fixed to said rotational shaft by a pin at one end portion of said wire.

9. An apparatus according to claim 1, wherein said oblique rod is provided with a cord, both ends of which cord are fixed to both ends of said oblique rod, said cord being wound on one end of said transmitting shaft, whereby said transmitting shaft is connected to said oblique rod, rotation of said transmitting shaft being transmitted to said oblique rod through said cord so that said oblique rod moves along the axis thereof.

10. An apparatus according to claim 11, wherein said transmitting shaft is swingably supported at the portion nearest to the portion where said transmitting shaft is connected to said oblique rod, so that said gear can be disengaged from said helical wire and said oblique rod moved directly by said transmitting shaft.

11. An apparatus according to claim 10, wherein said transmitting shaft is urged in a direction by a spring whereby said gear is engaged with said helical wire.

12. An apparatus according to claim 10, wherein said oblique rod is urged in a direction by a spring so that said cutter blade is moved away from said frame.

13. An apparatus according to claim 12, wherein said transmitting shaft is provided with a pin and a knob at a free end thereof, said pin being fixed to said transmitting shaft, said knob being engagable with said pin, so that said oblique rod is operated by said knob when said knob engages with said pin and said gear disengages from said helical wire, and said oblique rod is moved in the direction in which said cutter blade moves away from said frame when said knob disengages from said pin and said gear disengages from said helical wire.

14. An apparatus according to claim 1, wherein said rotating means has a spit provided at one end of said rotational shaft, and a handle connected to the other end of said rotational shaft, said spit projecting from said frame and impaling the core of the object to be sliced.

15. An apparatus according to claim 14, wherein a sectional shape of said spit is substantially a cross.

* * * * *

UNITED STATES PATENT AND TRADEMARK OFFICE
CERTIFICATE OF CORRECTION

PATENT NO. :  4,581,990
DATED      :  April 15, 1986
INVENTOR(S) : Hideo Matsumo It is certified that error appears in the above-identified patent and that said Letters Patent is hereby corrected as shown below:

Col. 1, line 53          After "Fig. 4" insert --is--

Col. 6, line 1           After "according to claim" delete "11" and substitute --7--

Signed and Sealed this

Twenty-ninth Day of July 1986

[SEAL]

Attest:

Attesting Officer

DONALD J. QUIGG

Commissioner of Patents and Trademarks